United States Patent

[11] 3,530,802

| [72] | Inventor | Hendrik Johan Edens<br>1740 Pharmacy Ave., Agincourt, Ontario, Canada |
|---|---|---|
| [21] | Appl. No. | 685,696 |
| [22] | Filed | Nov. 24, 1967 |
| [45] | Patented | Sept. 29, 1970 |
| [32] | Priority | Dec. 12, 1966 |
| [33] | | Canada |
| [31] | | 977,708 |

[54] PROPULSION SYSTEM FOR VEHICLES
9 Claims, 3 Drawing Figs.
[52] U.S. Cl. ........................................... 104/176, 104/172
[51] Int. Cl. ..................................... B61b13/12, B65g 27/20
[50] Field of Search .......................... 104/172, 176, 168, 165, 162

[56] References Cited
UNITED STATES PATENTS
| 250,787 | 12/1881 | Conger | 104/165 |
| 2,961,973 | 11/1960 | Bozman | 104/162 |
| 3,221,668 | 12/1965 | Munck | 104/147X |
| 3,403,633 | 10/1968 | Schwarzkopf | 104/68 |
| 3,420,188 | 1/1969 | Dehne, et al. | 104/172 |

Primary Examiner—Arthur L. La Point
Assistant Examiner—Robert Saifer
Attorney—Rogers, Bereskin and Parr ABSTRACT: A propulsion system for a rapid transit system employing vehicles supported on rails, consisting of a series of aligned, elongated rigid beams hingeably coupled together at their ends to form a long closed loop. The vehicles are supported and guided along a way or route by a pair of spaced parallel rails having a channel between them. The beams are located in the channel, and they are provided with wheels or rollers riding along the bottom of the channel. Guide means is provided to keep the beams properly aligned in the channel, and the beams are moved by means of driven belts which frictionally engage vertical webs of the beams. The vehicles are releasably attached to the beams at predetermined intervals along the lengths of the beams by means of a vehicle catching mechanism.

INVENTOR.
HENDRIK JOHAN EDENS
BY Rogers, Bereskin, & Parr

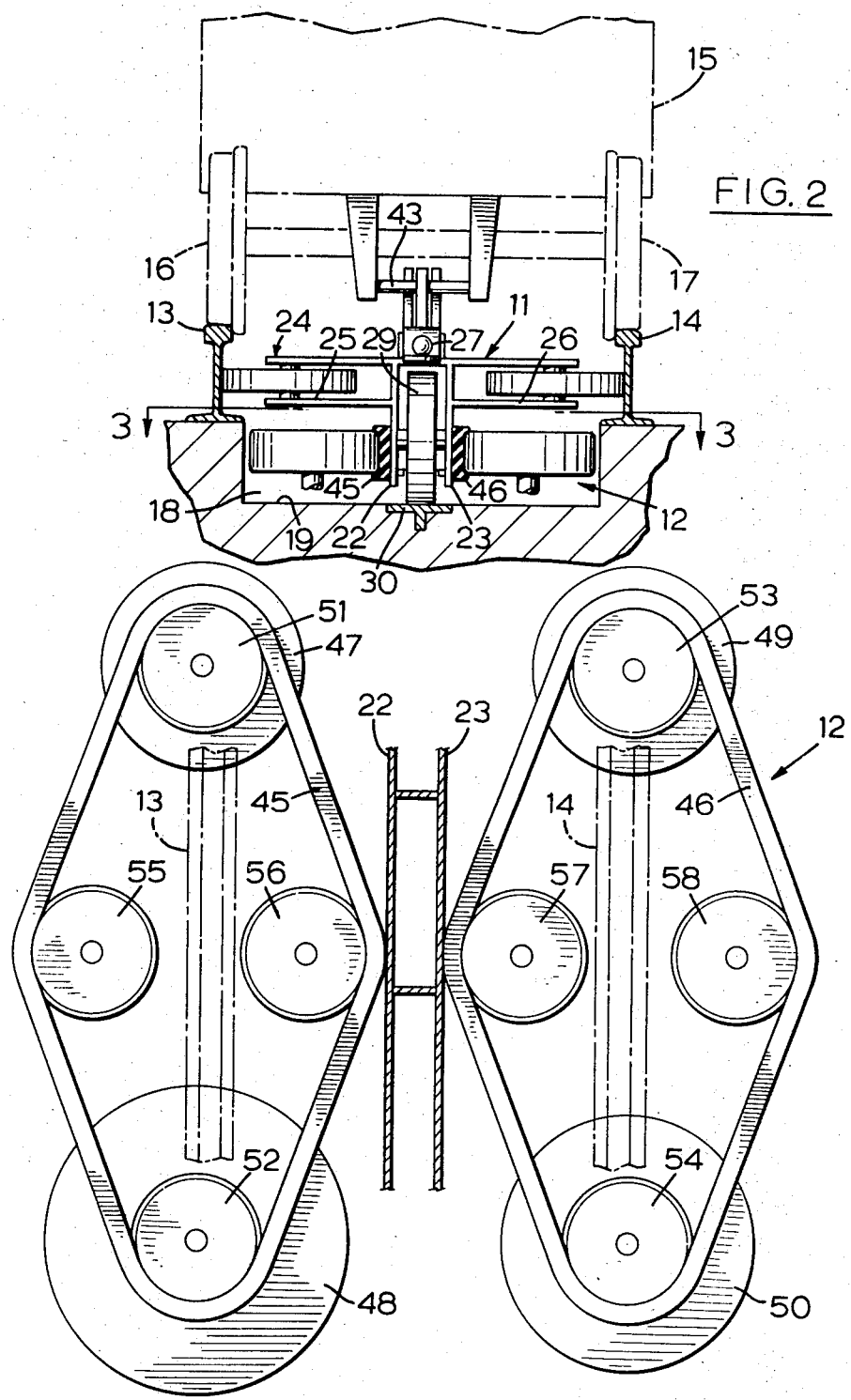

PROPULSION SYSTEM FOR VEHICLES

This invention relates to a propulsion system for vehicles, and in particular to a propulsion system for use with vehicles of a rapid transit system of the kind disclosed in co-pending U.S. Pat. application No. 645,201 of Hendrik J. Edens, filed June 12, 1967, now abandoned.

The vehicles disclosed in the above application are designed to each carry a relatively small number of passengers to selected destinations. The vehicles normally travel on conventional rails, except at switch locations where they may move sideways to assume one of two possible lateral positions. Switching is accomplished by changing the form of the vehicles at the switch locations instead of the form of the switches. Depending on the lateral position of the vehicle at a switch location, the vehicle either maintains its original course or else is switched to a branch line. Each vehicle is programmed in advance to follow a predetermined route, and the vehicles are capable of travelling independently of each other to predetermined destinations. Instead of being self-propelled, the vehicles are designed to be propelled by a propulsion system external to the vehicles, a preferred example thereof being described in detail herein.

It is considered desirable to direct the vehicles independently of each other to their predetermined destinations. Each vehicle is programmed to automatically follow a selected route, and no operator is required within the vehicle for controlling it. To provide each vehicle with its own propulsion system might result in accidents caused by failure of a motor or of a set of brakes in a vehicle. An alternative is the use of locomotives together with trains of coupled vehicles, but this leads to operational problems when it is desired that individual vehicles have independent routings. In the present invention, the vehicles are propelled by means of a continuous, constant speed conveyor consisting of a series of aligned, elongated rigid beams hingeably coupled together at their ends to form a long closed loop. The vehicles are supported and guided along a way or route by a pair of spaced parallel rails having a channel between them. The beams are located in the channel, and they are provided with wheels or rollers riding along the bottom of the channel. Guide means is provided to keep the beams properly aligned in the channel, and the beams are moved by means of driven belts which frictionally engage vertical webs of the beams. The vehicles are releasably attached to the beams at predetermined intervals along the lengths of the beams by means of a vehicle catching mechanism described below. The way can be built on the surface of the ground or else it can be elevated.

Objects of the invention are to provide a propulsion system for vehicles that is efficient, safe and which lends itself for use with an automatic rapid transit system.

A preferred embodiment of the invention is illustrated in the accompanying drawings, wherein:

FIG. 2 is a transverse sectional view of the way with a portion of a vehicle shown in chain-dotted lines; and FIG. 3 is a sectional view taken along the lines 3–3 in FIG. 2.

Figure 1:
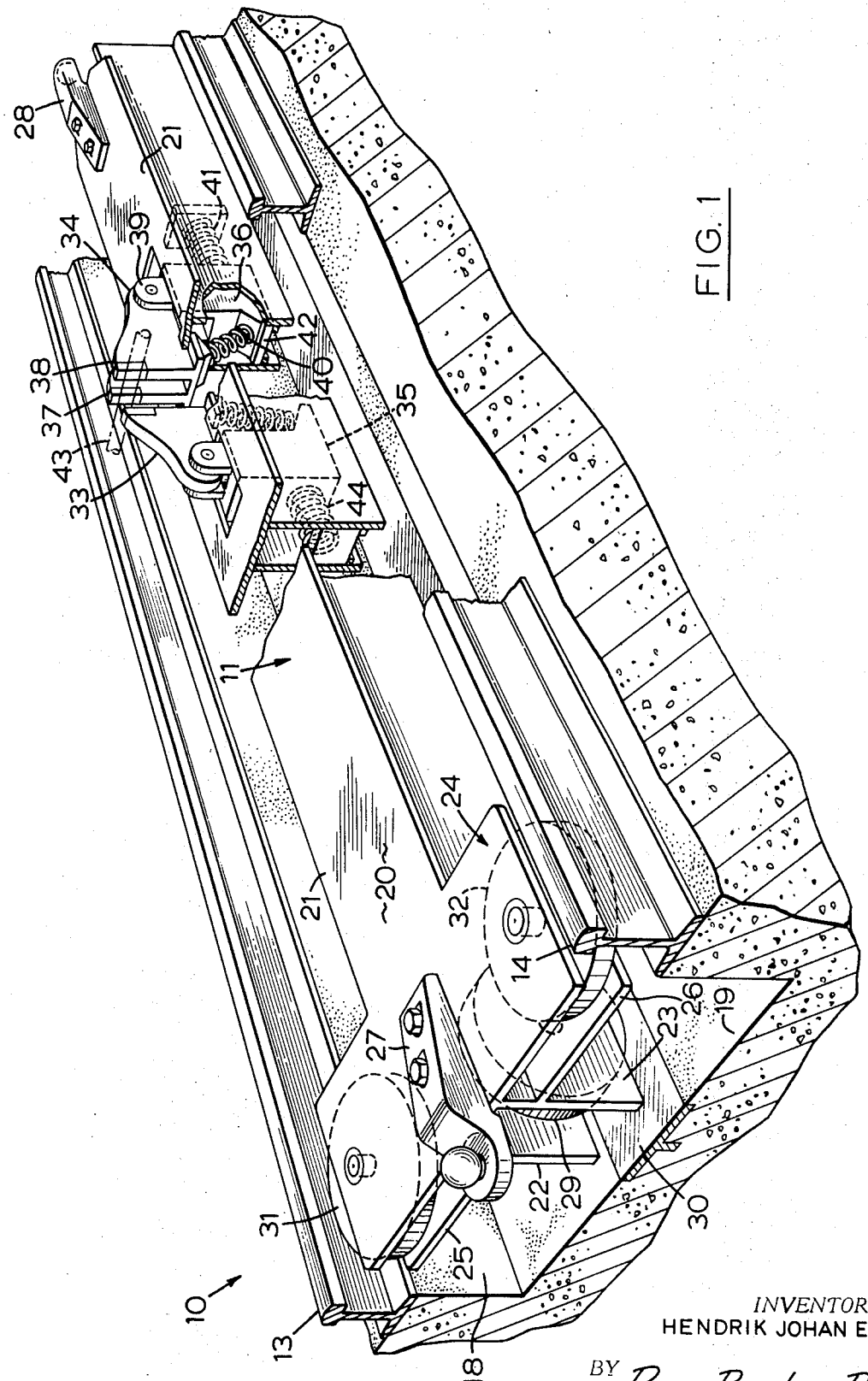
FIG. 1 is a perspective view, partly broken away, of one of the beams and part of the way.

Referring to the drawings, a preferred form of propulsion system according to the invention includes a way 10, conveyor means 11, and propulsion means 12 (FIGS. 2 and 3) for propelling the conveyor means 11. The way 10 includes a pair of spaced parallel rails 13 and 14 of conventional design for use with flanged wheels. In FIG. 2 a portion of a vehicle 15 is shown, the vehicle 15 being provided with flanged wheels 16 and 17 supported on the rails 13 and 14. Between the rails 13 and 14 there is a channel 18 having a horizontal bottom wall 19. The rails 13 and 14 are located near the edges of the channel 18, the walls of which are of concrete.

The conveyor means 11 includes a series of aligned, elongated rigid beams 20 hingeably coupled together at their ends and forming a long closed loop. Each beam 20 is provided with a horizontal upper flange 21 and two parallel spaced-apart vertical webs 22 and 23 integral with the flange 21 and extending downwardly therefrom. Thus, the cross section of the beams 20 resembles the shape of a double-T. At one end, the flange 21 forms an enlarged portion 24 integral with the remainder of the flange 21, and being of rectangular shape. Spaced below the enlarged portion 24 are two horizontal flanges 25 and 26 respectively extending from the webs 22 and 23 and located immediately below the enlarged portion 24. The beams 20 are typically about 50' long. As the beams 20 are only required to carry their own weight, they can be of comparatively lightweight construction.

The beams 20 are coupled together by means of any suitable coupling means which is adapted to provide a measure of universal movement to permit adjacent beams 20 to tilt or sway slightly with respect to each other. Illustrated in FIG. 1 is a ball and socket coupling consisting of a ball member 27 secured to one end of a beam and a socket member 28 secured to the opposite end of the beam for engagement with the respective ball and socket members of adjacent beams.

Each beam 20 preferably is supported by a wheel 29 journaled in the webs 22 and 23 and located beneath the enlarged flange portion 24. A flat steel strip 30 is embedded in the bottom wall 19 of the channel 18 to provide a smooth, hard surface for the wheels 29. Alternatively, rollers could be installed in the way to movably support the beams 20; in this case the undersides of the beams 20 would be closed by a longitudinal plate extending the length of the beams 20, between the webs 22 and 23. These plates would ride along the rollers. Conventional expansion joints are provided in the rails 13, 14 and the strip 30 to accommodate changes in length due to temperature variations. Changes in the length of the beams 20 are accommodated, for example, as follows. At the ends of the system the beams 20 (and the way) form a loop. By suitably designing the way in the area of the loops, changes in length of the beams can be accommodated by permitting the radius of the coupled beams in the area of the loops to increase or decrease. The vehicles need not travel in this area.

The beams 20 are kept in exact alignment in the way 10 by means of a pair of horizontal guide wheels 31 and 32 respectively journaled for rotation in the enlarged flange portion 24 and the flanges 25 and 26. Each of the wheels 31 and 32 is respectively in rolling contact with the inner surfaces of the webs of the rails 13 and 14. This arrangement therefore serves to keep the axes of the beams 20 parallel with the rails 13 and 14. The wheels 31 and 32 preferably are of hard rubber, and they can be spring loaded to allow for variations in the alignment of the beams in horizontal curves. Incidentally, electricity for the interiors of the vehicles is conveniently provided by employing generators which are coupled to the shafts of the flanged wheels 16 and 17, together with batteries that are kept charged by the generators.

If there is any tendency for the beams to tip, the axes of the guide wheels 31 and 32 can be slightly inclined from the vertical, with a corresponding change being made in the configuration of the webs of the rails 13, 14 to suit.

In the proposed rapid transit system utilizing the present propulsion system and the vehicles described in co-pending Canadian Pat. application No. 965,386 referred to above, the vehicles are releasably attached to the beams 20 at spaced intervals. Before the vehicles are switched from one set of rails to another, they are disengaged from the conveyor system 11. At a switch location, the vehicles assume one of two possible lateral positions, and the particular lateral position of the vehicle determines whether it remains on course or else is switched to a branch line. At the end of the switch, the vehicles are directed onto one of two sets of rails, one leading away from the main line and the other remaining on course. The two sets of rails intersect in a conventional railway "frog", and both pairs of rails are elevated above the conveyor system 11 in the vicinity of the frog to avoid interference therewith.

A suitable form of vehicle catching mechanism for releasably attaching the vehicles to the beams 20, which is best shown in FIG. 1, includes a pair of downwardly pivotable members 33 and 34 which respectively are supported by movable carriages 35 and 36 carried by the beams 20. The member 34 consists of two spaced-apart, parallel upstanding plates 37 and 38. At one end, the plates 37 and 38 are pivotally supported in bearing blocks 39 (only one of which is shown). The upper surfaces of the plates 37 and 38 curve smoothly downwardly for a purpose to be described below. A large spring 40 biases the plates 37 and 38 upwardly against a stop provided by the lower surface of the flange 21 of the beam 20. Another large spring 41 biases the carriage 36 axially towards the left (as viewed in FIG. 1) against a stop member 42 extending between the webs 22 and 23 of the beam 20. The construction and operation of the plate 33 is similar to that described above, except that in this case only one upstanding plate is necessary. When the plates 33, 37 and 38 are in their normal positions, as shown in FIG. 1, there is a gap of approximately 2 inches between them, which is sufficient to recieve a horizontal roller 43 secured to the underside of the vehicles. When the vehicles are engaged by the beams 20, their respective rollers 43 are caught between the plates 33, and 37, 38. In order to remove the vehicle from the propulsion system, it is merely necessary to elevate the rails 13 and 14 sufficiently so that the rollers 43 clear the plates 33, 37 and 38. Conversely, when it is desired to send a vehicle from a branch line onto the main line, the vehicles are accelerated onto the rails 13 and 14 with a speed slightly greater than that of the beams 20. Assuming that the beams 20 are travelling towards the right when viewed in FIG. 1, as the vehicle slows down its roller 43 contacts the curved upper surface of the plates 37 and 38, causing them to pivot downwardly against the spring 40. When the roller 43 has cleared the plates 37 and 38 it remains in the gap between the plates 33 and 37, 38. A spring 44 acting on the carriage 35 absorbs any shock which may occur when the roller 43 contacts the plate 33. After the roller 43 has cleared the plates 37 and 38, the spring 40 returns the plates 37 and 38 to their normal position, as shown in FIG. 1. If it becomes necessary to make an emergency stop (e.g. by applying braking force to beams 20), the plates 37 and 38 then act against the roller 43 to bring the vehicle to a halt.

The plate 33 is made downwardly pivotable in order to accommodate any vehicles which might strike the vehicle catching mechanism immediately after engaging the rails 13 and 14. In this case, the vehicle would be travelling slightly faster than the beam 20 for a short period, and during this period the roller 43 of the vehicle would act against the curved upper surface of the plate 33 in the same manner described above with reference to the plates 37 and 38.

Where the main line intersects a branch line (e.g. at a "frog"), it is desirable that the point of intersection be elevated above the beams 20 sufficiently to avoid interference with the conveyor system 11. In some cases, it may be sufficient to simply increase the height of the web portion of the rails 13 and 14 to provide the required clearance. Alternatively, the rails 13 and 14 could simply be elevated, but it would then be necessary to modify the channel 18 so that its vertical walls would provide guidance for the horizontal guide wheels 31 and 32.

The beams 20 are propelled by means of pairs of driven belts 45 and 46 (see FIG. 3) which are in frictional engagement with the webs 22 and 23 of the beams 20. The belts 45 and 46 are driven by means of electric motors 47, 48, 49 and 50 which are respectively connected to belt driving wheels 51, 52, 53 and 54 through suitable clutches (not shown). In addition, each belt 45, 46 is provided with a pair of idler wheels 55, 56 and 57, 58. The idler wheels 56 and 57 are respectively adapted to keep the belts 45 and 46 in frictional engagement with the webs 22 and 23. The idler wheels 56 and 57 should be provided with shock-absorbing mountings, and they should preferably be easily movable away from the beams 20 in case of trouble with the conveyor mechanism. In addition, to reduce or prevent vibration of the beams 20, additional idler wheels can be installed immediately adjacent the idler wheels 56 and 57, e.g. one on each side of each. This arrangement would substantially increase the area of contact between the belts 45, 46 and the beams 20. Incidentally, the joints between the beams 20 should be made as smooth as possible to prevent vibration and reduce wear of the belts 45, 46. The motors 47, 48, 49 and 50 are preferably of the synchronous type, so that the speeds of all the motors in the system can accurately be controlled.

In some cases it may be desirable to link branch lines servicing suburban stations with the main line, without using a continuous closed loop of beams 20 in the branch line, as the cost might be prohibitive. In such cases it is suggested that short (e.g. 10 unit) trains of self-propelled beams 20 be used for propelling the vehicles along the branch lines. The beams 20 would be provided with motors for driving the horizontal guide wheels 31 and 32. Means should be provided to bias the guide wheels 31 and 32 against the respective flanges of the rails 13 and 14 to avoid slippage. A train consisting of coupled beams 20, for example, could be used to propel up to 10 vehicles along a branch line to or from a point where the vehicles would enter or depart from the main line. Such trains could also be used for interurban transit.

I claim:
1. A propulsion system for vehicles, comprising:
 a. a way including:
  i. a pair of spaced parallel rails adapted to support and guide vehicles along the way; and
  ii. a channel between the rails, the channel having a bottom wall;
 b. conveyor means for moving vehicles along the way, including:
  i. an elongated rigid beam having spaced apart parallel longitudinal sides;
  ii. beam supporting means cooperating with the bottom of the channel and adapted to permit the beam to be moved along the way;
  iii. beam guide means supported by the beam and adapted to maintain the axis of the beam parallel with the rails; and
  iv. vehicle catching means secured to the beam at predetermined intervals along the length of the beam, said vehicle catching means being adapted to releasably attach vehicles to the beam automatically as said vehicle moves relative to said beam in either direction along said way; and
 c. beam propulsion means adapted to cooperate with said longitudinal sides of said beam to move said beam linearly along the way, said beam propulsion means including pairs of driven belts which are respectively in frictional engagement with the sides of the beam.

2. A propulsion system for vehicles as claimed in claim 1 which comprises a plurality of said rigid beams, said beams being aligned and hingeably coupled together at their ends.

3. A propulsion system for vehicles as claimed in claim 2 wherein the beams each have a horizontal upper flange and two downwardly extending, elongated, parallel, spaced-apart vertical webs integral with the upper flange, the upper flange having an elongated portion at one end of each beam, and the beams each having horizontal lower flanges respectively extending outwardly from each web at said one end, and spaced below the enlarged portion of the upper flange, and wherein the beams form a continuous loop.

4. A propulsion system for vehicles as claimed in claim 3 wherein the beam supporting means includes vertical wheels mounted for rotation between the webs of the beams.

5. A propulsion system for vehicles as claimed in claim 3 wherein the beam guide means includes a pair of horizontal guide wheels for each beam, the guide wheels being respectively mounted for rotation between said enlarged upper flange portion and the lower flanges of the beams, and the guide wheels respectively being in rolling contact with vertical inner edges of the rails.

6. A propulsion system for vehicles as claimed in claim 5 wherein the vehicle catching means includes pairs of aligned vertical plates pivotally connected to the respective upper flanges of the beams, said pairs of plates being spaced at intervals along the length of the beams with one such pair for each vehicle, the plates of each pair being sufficiently spaced from each other to permit them to receive in the space between them a transverse bar carried by each vehicle, each plate having a curved upper surface adapted to cooperate with the bar as the vehicle passes over the plate to cause said plate to pivot downwardly until the bar has cleared said plate and has been caught in the space between the plates.

7. A propulsion system for vehicles as claimed in claim 5 wherein the beams are respectively coupled together by a ball and socket coupling adapted to permit limited universal movement of adjacent beams.

8. A propulsion system for vehicles as claimed in claim 3 wherein the beam supporting means includes vertical wheels mounted for rotation between the webs of the beams, and wherein the beam guide means includes a pair of horizontal guide wheels for each beam, the guide wheels being respectively mounted for rotation between said enlarged upper flange portion and the lower flanges of the beams, and the guide wheels respectively being in rolling contact with vertical inner edges of the rails.

9. A propulsion system for vehicles as claimed in claim 8 wherein the beams are respectively coupled together by a ball and socket coupling adapted to permit limited universal movement of adjacent beams.